(12) United States Patent
Lee et al.

(10) Patent No.: US 7,175,272 B2
(45) Date of Patent: Feb. 13, 2007

(54) SPECTACLES AND SUNSHADE CLIP ASSEMBLY USING MAGNETS

(75) Inventors: Suk-Jae Lee, Daegu (KR); Ju-Jae Lee, Daegu (KR); Hyun-Jun Lee, Daegu (KR); Sung-Jun Lee, Daegu (KR)

(73) Assignee: Suk-Jae Lee et al., Daegu (KR)

( * ) Notice: Subject to any disclaimer, the term of this patent is extended or adjusted under 35 U.S.C. 154(b) by 0 days.

(21) Appl. No.: 11/061,537

(22) Filed: Feb. 18, 2005

(65) Prior Publication Data

US 2006/0187408 A1 Aug. 24, 2006

(51) Int. Cl.
*G02C 9/00* (2006.01)
(52) U.S. Cl. .......................................... 351/47; 351/57
(58) Field of Classification Search .................. 351/47, 351/57, 48, 58, 44, 41, 158
See application file for complete search history.

(56) References Cited

U.S. PATENT DOCUMENTS 5,975,691 A * 11/1999 Ku ................................ 351/47
6,109,747 A * 8/2000 Chao ............................ 351/47

* cited by examiner

*Primary Examiner*—Hung Xuan Dang
(74) *Attorney, Agent, or Firm*—Mayer Brown Rowe & Maw LLP

(57) ABSTRACT

Disclosed herein is a spectacles and sunshade clip assembly using magnets. The magnets serve to detachably attach the sunshade clip to the spectacles. The spectacles comprises a pair of lens frames connected to each other by means of a nose bridge, and temple arms connected, respectively, to the lens frames by means of magnetically-induced hinges. The sunshade clip comprises a pair of sunshade lenses formed by cutting a colored plastic plate into a desired lens form, and a sunshade bridge formed by injection molding and adapted to connect the sunshade lenses to each other. Two magnet ribs are coupled to opposite outer ends of the sunshade lenses to extend in opposite directions. Each of the magnet ribs is configured to substantially coincide with the outer contour of the hinge provided at the spectacles and has a magnet mounted to face the hinge.

4 Claims, 6 Drawing Sheets

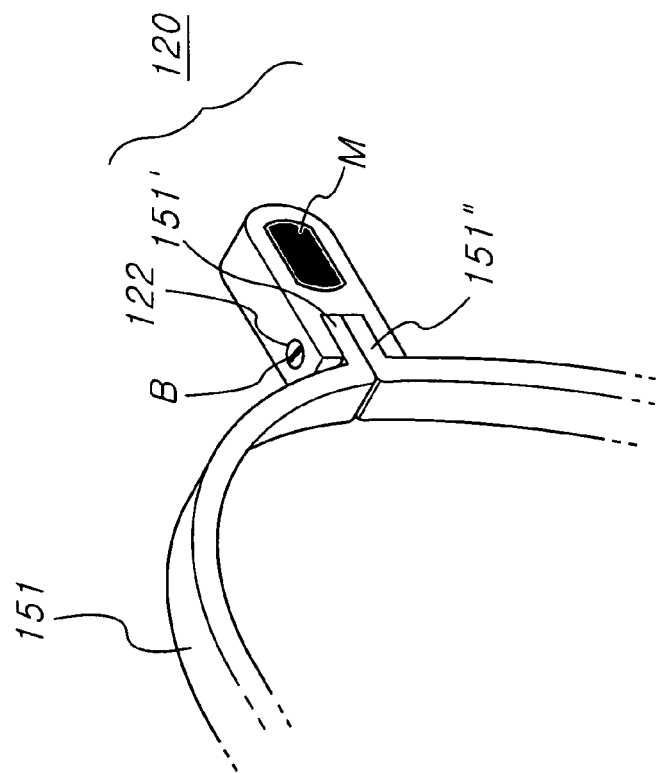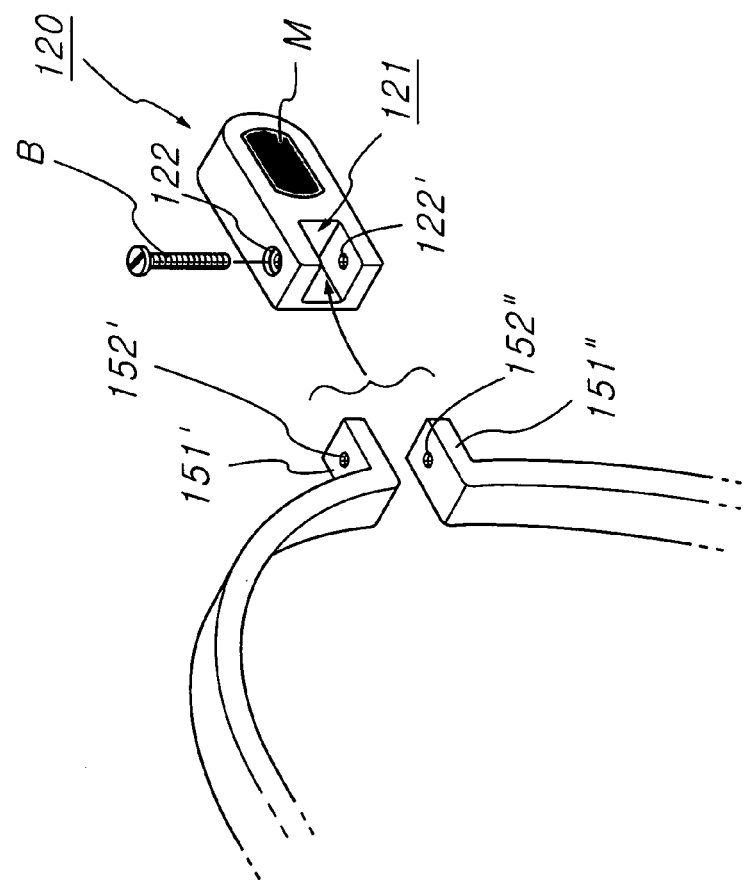

SPECTACLES AND SUNSHADE CLIP ASSEMBLY USING MAGNETS

BACKGROUND OF THE INVENTION

1. Field of the Invention

The present invention relates to a spectacles and sunshade clip assembly using magnets, and more particularly to a spectacles and sunshade clip assembly using magnets which can permit the sunshade clip, serving as sunglasses, to be detachably attached to the spectacles.

2. Description of the Related Art

Conventionally, there has been proposed to detachably attach a sunshade clip to spectacles by means of magnets. As an effect of continuous research, the inventors of the present invention succeeded in providing a spectacles and sunshade clip assembly using improved magnets.

Conventional spectacles and sunshade clip assemblies using magnets have several configurations to mount the magnets to corresponding portions of both sunshade clip and spectacles. However, these conventional several configurations exhibit many problems in use.

First, the conventional spectacles and sunshade clip assemblies have difficulty in the storage of the sunshade clip after separation from the spectacles. Second, the conventional spectacles and sunshade clip assemblies are inconvenient in use and attachment therebetween due to the heavy weight of the magnets. Especially, in the case of the sunshade clip having a relatively thin elongated form, it shows only a low structural strength and thus is easily damaged. For this reason, the sunshade clip must be carefully handled.

SUMMARY OF THE INVENTION

Therefore, the present invention has been made in view of the above problems, and it is an object of the present invention to provide a spectacles and sunshade clip assembly using magnets, which can permit a sunshade clip to be easily attached to or detached from spectacles, thereby enabling safe storage and use of the sunshade clip and improving adaptability of the sunshade clip to various kinds of spectacles, resulting in high marketability of products.

It is another object of the present invention to provide a spectacles and sunshade clip assembly using magnets which has a simple and elastic configuration suitable to increase flexibility in application thereof and can show lightness when being worn by a wearer.

BRIEF DESCRIPTION OF THE DRAWINGS

The above and other objects, features and other advantages of the present invention will be more clearly understood from the following detailed description taken in conjunction with the accompanying drawings, in which:

FIGS. 6a and 6b are enlarged perspective views of the circle D shown in FIG. 5, FIG. 6a illustrating a separated state of a magnet rib, while FIG. 6b illustrating a coupled state of the magnet rib.

DESCRIPTION OF THE PREFERRED EMBODIMENTS

Now, preferred embodiments of an assembly of a sunshade clip and spectacles using magnet means in accordance with the present invention will be described in detail with reference to the annexed drawings.

Figure 1:
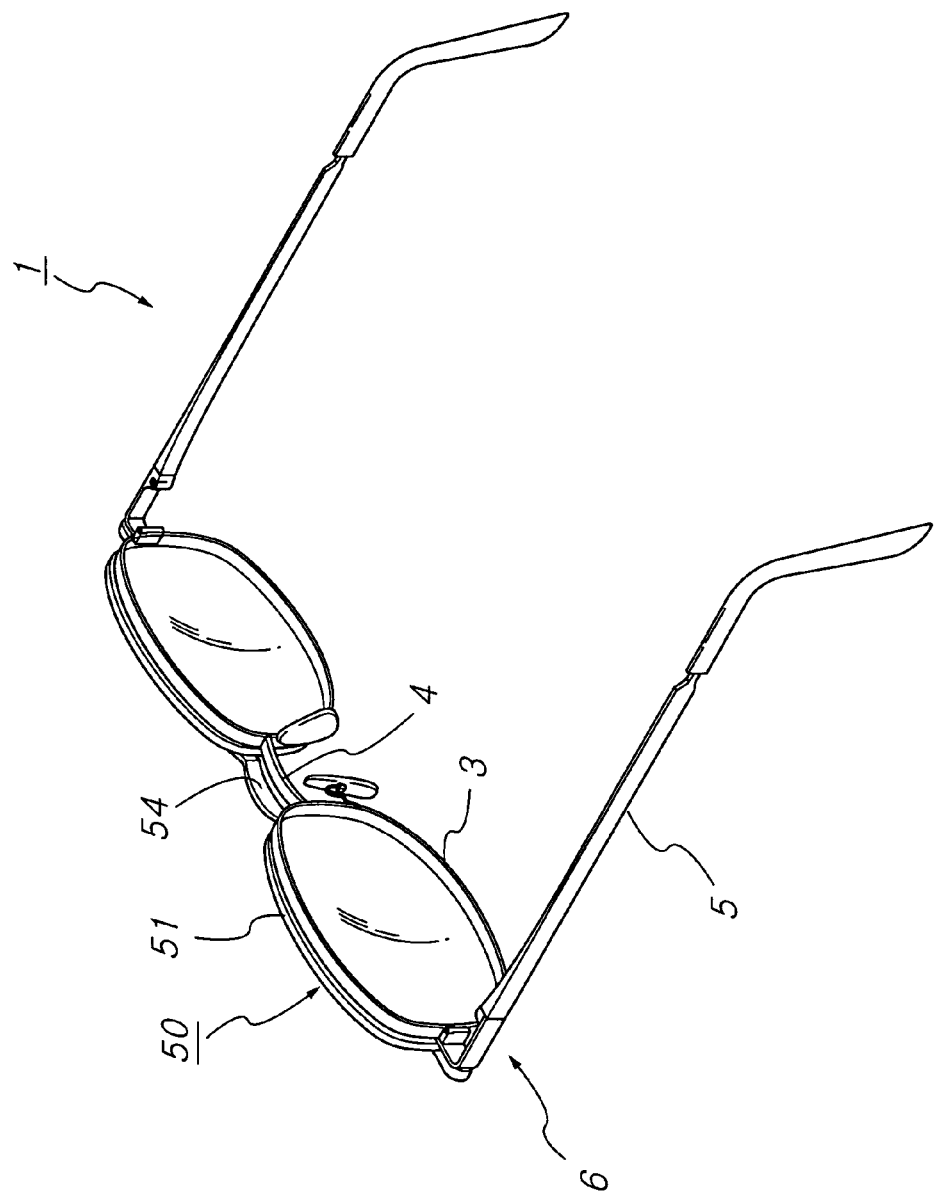
FIG. 1 is a rear perspective view of a spectacles and sunshade clip assembly using magnets in accordance with a first embodiment of the present invention.
Figure 2:
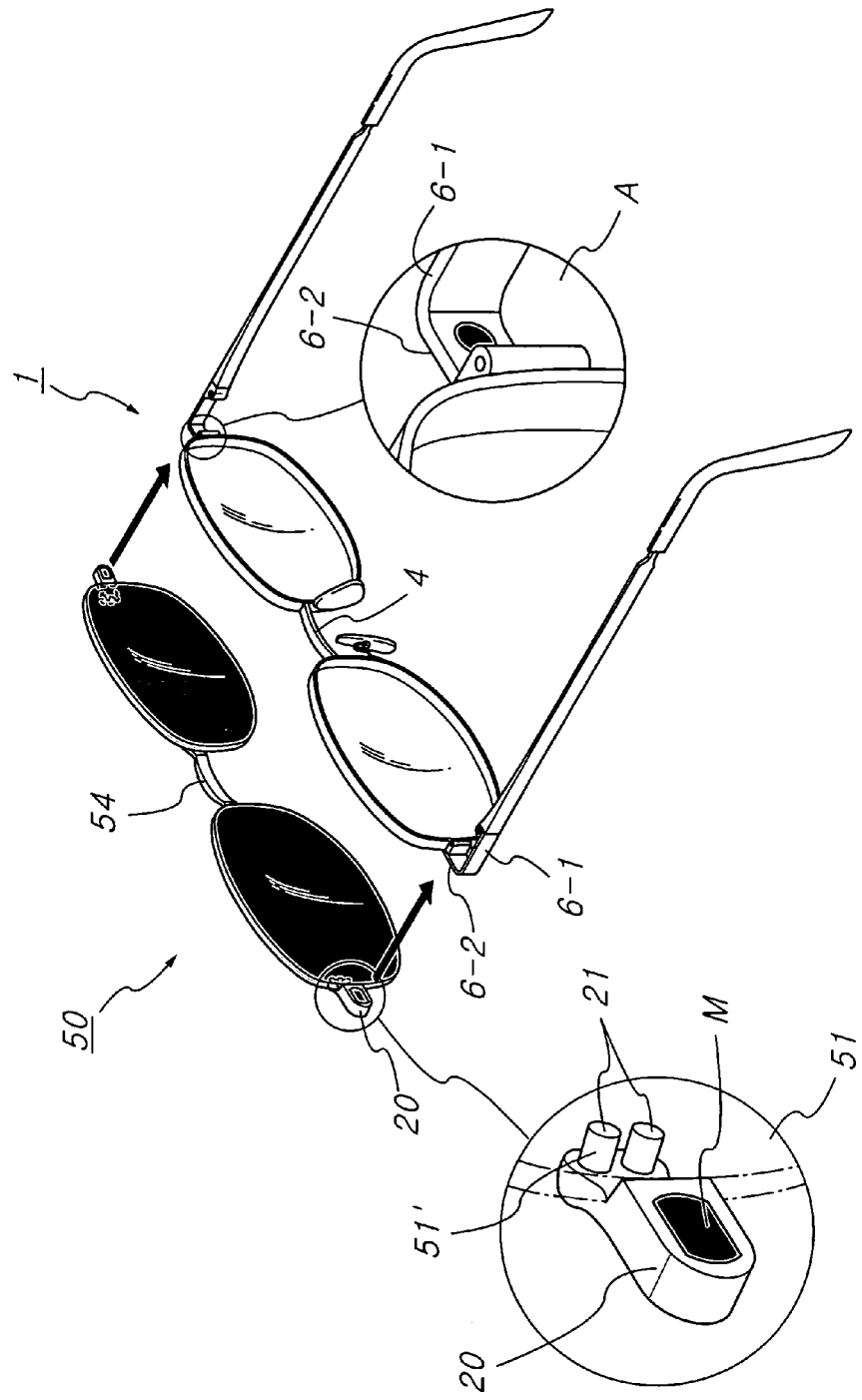
FIG. 2 is an exploded perspective view of the spectacles and sunshade clip assembly shown in FIG. 1, the important parts of the sunshade clip being shown in enlarged circles.
Figure 3:
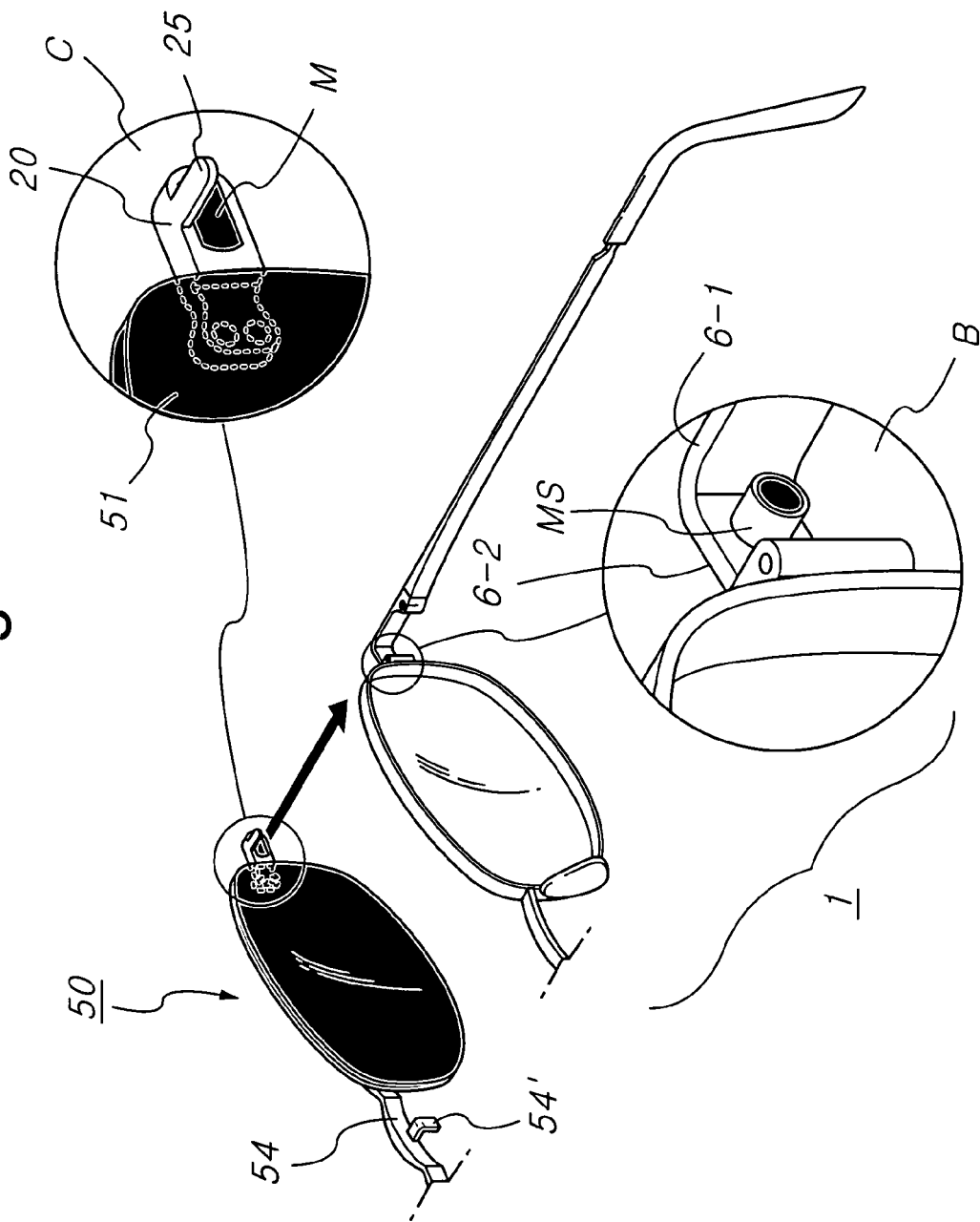
FIG. 3 is a partially cut-away exploded perspective view of a spectacles and sunshade clip assembly in accordance with a second embodiment of the present invention, the important part of the sunshade clip being shown in an enlarged circle.
Figure 4:
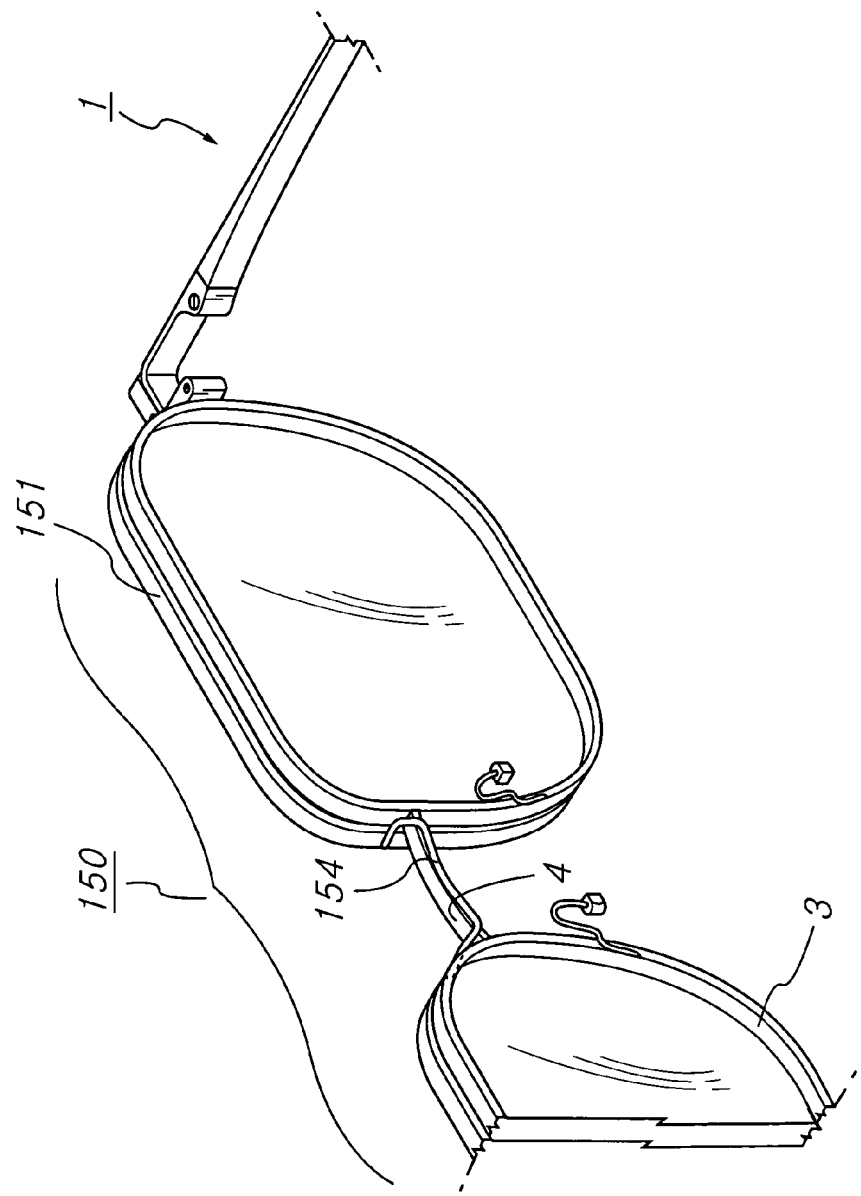
FIG. 4 is a partially cut-away rear perspective view of a spectacles and sunshade clip assembly in accordance with a third embodiment of the present invention.
Figure 5:
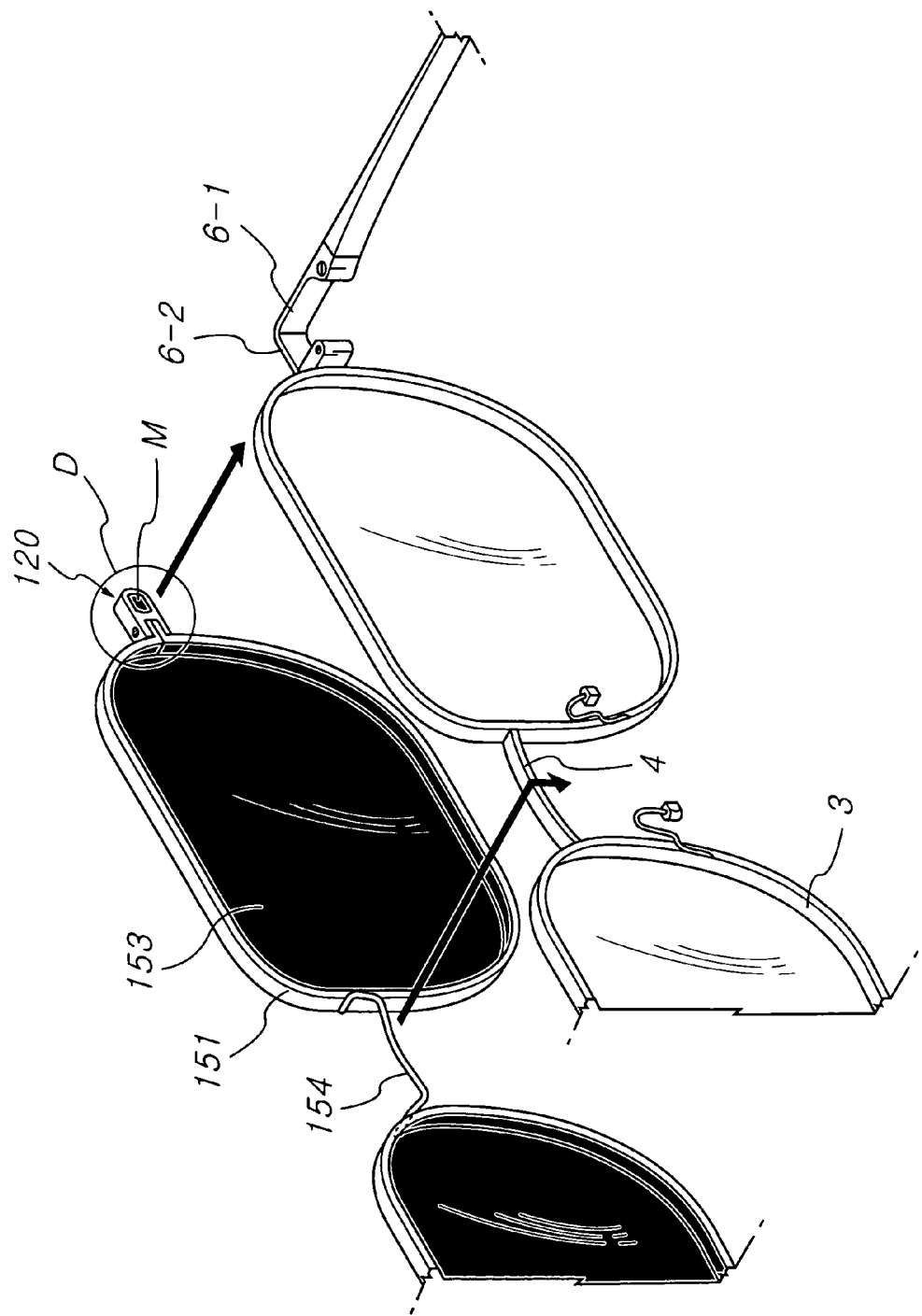
FIG. 5 is a partially cut-away exploded perspective view of the spectacles and sunshade clip assembly shown in FIG. 5.

Although FIGS. 1 and 2 illustrate a first embodiment of the present invention, FIG. 3 illustrates an alternative second embodiment of the present invention, and FIGS. 4 to 6 illustrate another alternative third embodiment of the present invention, the basic technical ideas of the respective embodiments are identical to one another.

Without being limited to the annexed drawings, the spectacles and sunshade clip assembly using magnets according to the present invention can involve various kinds of spectacles, especially metal-rimmed spectacles. Since left and right sides of both the spectacles and sunshade clip are symmetrical, hereinafter, only one side thereof will be designated by reference numerals and explained.

FIGS. 1 and 2 are a rear perspective view and an exploded perspective view illustrating a spectacles and sunshade clip assembly using magnets according to a first embodiment of the present invention. The first embodiment relates to metal-rimmed spectacles.

As shown in FIGS. 1 and 2, the metal-rimmed spectacles, designated as reference numeral 1, comprise a pair of lens frames 3, a nose bridge 4 for connecting the lens frames 3 to each other, and a pair of temple arms 5 connected to opposite outer ends of both the lens frames 3 by means of L-shaped hinges 6. The spectacles 1 are detachably attached to a sunshade clip 50.

In the present embodiment, the sunshade clip 50 has a substantially similar form to the spectacles 1, and comprises a pair of sunshade lenses 51 and a sunshade bridge 54 interposed between the sunshade lenses 51 to connect them. The sunshade lenses 51 are formed by cutting a colored plastic plate into a desired lens form or formed by injection molding of synthetic resin material. The sunshade bridge 54 is also formed through injection molding.

The sunshade clip 50 further comprises a pair of magnet ribs 20 which are coupled to opposite outer ends of the sunshade lenses 51 to extend in opposite directions. Such magnet ribs 20 may be integrally molded with the respective lenses 51, or may be formed as separate elements through injection molding. In the latter case, the magnet ribs 20 are coupled to the respective sunshade lenses 51 by means of fastening pins 21. The magnet ribs 20 are configured to substantially coincide with the hinges 6 of the spectacles 1 so as to be securely attached thereto.

Each of the magnet ribs 20 is adapted to receive a magnet M. The magnet M is freely selectable from among various kinds of magnets, and is fixedly inserted in the magnet rib 20 to face an associated one of the hinges 6, more particularly, a linear plate portion 6-2 of the L-shaped hinge 6.

The L-shaped hinge 6 consists of the linear plate portion 6-2 and a bent connector portion 6-1 as shown in the enlarged circle A of FIG. 2, and is made of a magnetically induced material, so as to allow the magnet M mounted in the magnet rib 20 of the sunshade clip 50 to be attached to the plate portion 6-2 of the hinge 6.

If necessary, a magnet may be added to the linear plate portion 6-2 of the hinge 6 to increase attachment force.

There are some kinds of special materials for the nose bridge 4 for connecting the lens frames 3 to each other like a shape memory alloy. If the memory metal is adapted for the nose bridge 4, it is desirable that the sunshade bridge 54 is sufficiently flexible to be fit and bent according to the nose bridge 4.

FIG. 3 is a partially cut-away rear perspective view illustrating only one side of a spectacles and sunshade clip assembly in accordance with a second embodiment of the present invention, and the important part of the spectacles and the sunshade clip are shown in enlarged circles B and C.

As shown in FIG. 3, in the second embodiment of the present invention, the magnet rib 20 of the sunshade clip 50 is integrally provided with a latch pin 25 extending rearward, i.e. toward the spectacles 1, and the sunshade bridge 54 of the sunshade clip 50 is integrally provided with a bridge pin 54' protruding rearward, i.e. toward the spectacles 1. The bridge pin 54' is formed at the center of the sunshade bridge 54 by injection molding and has an L-shaped form suitable to securely catch the nose bridge 4 of the spectacles 1. Further, a magnet MS is attached to a rear surface of the linear plate portion 6-2 of the hinge 6 provided at the spectacles 1.

With such a configuration of the present embodiment, in addition to permitting the sunshade clip 50 to be attached to and supported by the spectacles 1 by making use of the interaction of the magnet M mounted in the magnet rib 20 and the magnet MS mounted in the hinge 6, the sunshade clip 50 is able to be more securely attached to and supported by the spectacles 1 by virtue of the mechanical supporting force caused by the latch pin 25 and the bridge pin 54'.

FIGS. 4 to 6 illustrate a third embodiment of the present invention. In the present embodiment, to the spectacles 1 is detachably attached a sunshade clip 150 comprising a pair of sunshade lenses 153, a pair of sunshade lens frames 151 made of metal and a sunshade bridge 154 interposed between the lens frames 151 to connect them.

The sunshade bridge 154 of the present embodiment takes the form of an approximately L-shaped wire suitable to securely catch the nose bridge 4 of the spectacles 1.

Referring to FIGS. 6a and 6b illustrating the circle D of FIG. 5 with an enlarged scale, the lens frame 151 of the sunshade clip 150 is divided at an outer end thereof, and a pair of coupling lugs 151' and 151" are integrally formed at respective divided sections of the lens frame 151. Such a configuration is effective for the insertion and fixation of the sunshade lens 153. The coupling lugs 151' and 151" have bolt holes 152' and 152", respectively. In the present embodiment, the sunshade clip 150 further has a magnet rib 120 which is injection molded so that a magnet M is embedded in part of the magnet rib 120 and the other part of the magnet rib 120 defines a lug receiving recess 121. The lug receiving recess 121 is shaped and sized to receive a pair of the coupling lugs 151' and 151". The magnet rib 120 further has a pair of bolt holes 122 located at upper and lower sides of the lug receiving recess 121. In a state wherein the coupling lugs 151' and 151" are inserted in the lug receiving recess 121, the bolt holes 122 are vertically aligned with the bolt holes 152' and 152".

As shown in FIGS. 6a and 6b, when the coupling lugs 151' and 151" of the lens frame 151 are inserted in the lug receiving recess 121 of the magnet rib 120 and a bolt B is screwed through the bolt holes 122 of the magnet rib 120 and the bolt holes 152' and 152" of the coupling lugs 151' and 151", the coupling lugs 151' and 151" are coupled to each other at the same time while being mounted in the magnet rib 120. Thereby, the magnet rib 120 is able to be securely mounted to the lens frame 151 with an improved exterior appearance, without leaving any outwardly protruding portion.

As apparent from the above description, the present invention provides a spectacles and sunshade clip assembly using magnets which can reduce the weight of the assembly through an optimized attachment configuration, thereby increasing adaptability to products.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spectacles and sunshade clip assembly comprising a sunshade clip attachable to spectacles using magnets, the spectacles having a pair of lens frames connected to each other by means of a nose bridge and temple arms connected, respectively, to the lens frames by means of magnetically-induced hinges, wherein
the sunshade clip comprises:
a pair of sunshade lenses formed by cutting a colored plastic plate into a desired lens form;
a sunshade bridge formed by injection molding and adapted to connect the sunshade lenses to each other; and
a pair of magnet ribs which are integrally molded with the respective lenses and coupled to opposite outer ends of the sunshade lenses to extend in opposite directions, each of the magnet ribs being configured to substantially coincide with the outer contour of an associated one of the hinges provided at the spectacles and having a magnet mounted to face the associated hinge.

2. The assembly as set forth in claim 1, wherein each of the hinges of the spectacles has an L-shaped form consisting of a linear plate portion and a bent connector portion, and
wherein the linear plate portion of the hinge is formed as a metal element or an injection molded element made of a magnetically-induced material or having a magnet mounted to face the magnet of the sunshade clip.

3. The assembly as set forth in claim 1, wherein a respective one of the magnet ribs of the sunshade clip is integrally provided with a latch pin extending toward the hinge of the spectacles; and
a magnet is attached to a rear surface of a linear plate portion of a respective one of the hinges provided at the spectacles.

4. The assembly as set forth in claim 1, wherein a shape memory alloy is adapted for the nose bridge and the sunshade bridge is made of flexible material to be fit and bent according to the bridge.

* * * * *